Patented June 2, 1953

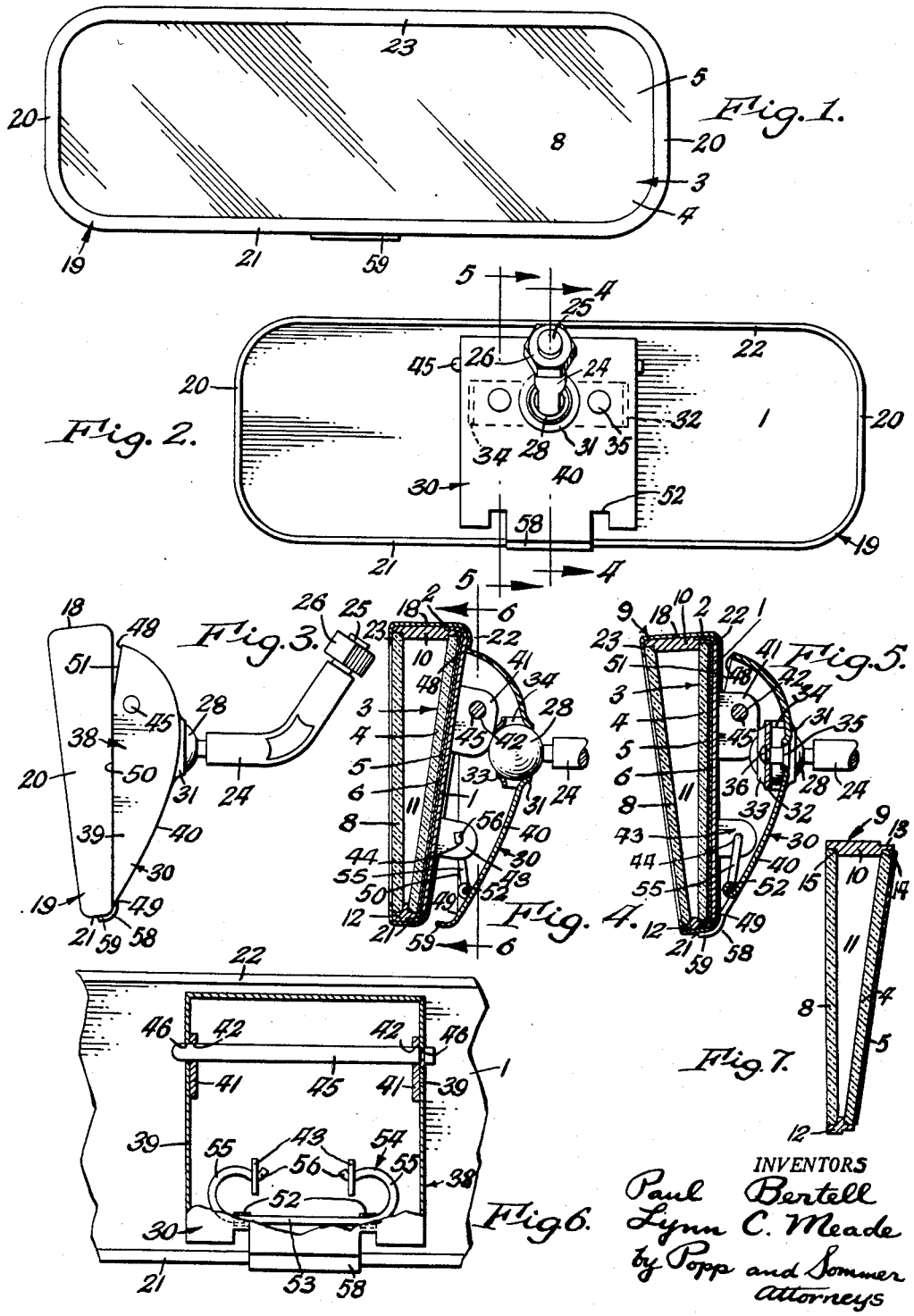

2,640,394

UNITED STATES PATENT OFFICE 2,640,394

REAR-VISION MIRROR

Paul Bertell, Kenmore, and Lynn C. Meade, Buffalo, N. Y., assignors to Standard Mirror Company, Buffalo, N. Y., a corporation of New York Application February 27, 1951, Serial No. 212,983

11 Claims. (Cl. 88—77)

This invention relates to a mounting for glare reducing rear vision mirrors and more particularly to such a mounting for a rear vision mirror adapted for both night and day driving wherein the brightness of images or light from headlights or sun can be reduced selectively to the desired intensity.

The invention is particularly shown as embodied in a rear vision mirror having a primary mirror in the form of a glass panel which is silvered or otherwise provided with a highly reflecting coating and which is arranged adjacent to and at an angle to a secondary transparent reflecting plate and in which the secondary transparent plate is arranged in advance of and tilted with respect to the primary mirror so that they are disposed at a slight angle, the latter preferably opening upwardly. In the particular rear vision mirror shown, the bright or high intensity image is reflected from the reflective metallic coating of the primary mirror and the low intensity image is reflected from the front or exposed face of the secondary transparent reflecting plate. The same effect can be achieved with a single prismoidal mirror as shown in the LaHoduy and Bertell Patent No. 2,325,615 granted August 3, 1943, for Mounting for Rear Vision Mirrors, where the high intensity image is reflected from the metallic reflective coating on the back of the prismoidal glass panel and the low intensity image is reflected from the front face of the prismoidal glass panel. It is also possible to employ images of other intensity by selecting, as disclosed in the Sherts Patent No. 2,455,818 granted December 7, 1948, for Glare Reducing Rear-Vision Mirror, images which have been subjected to different numbers of cross reflections between the primary mirror and the secondary transparent plate. In all cases the different images are selected by adjusting the vertical angularity of the reflector or array about an axis generally parallel with both of the reflective surfaces to obtain images of the desired intensity.

One of the principal objects of the invention is to provide such a rear vision mirror which can be quickly and positively adjusted to one of two positions in one of which a high intensity image is reflected to the driver of the car and in the other of which a low intensity image is reflected to the driver. By this means the driver can quickly adjust the rear vision mirror to the position dictated by the driving conditions and it is unnecessary for him to carefully adjust the mirror to the relatively critical angularity required for reflection of an image of any particular intensity.

Another object is to provide such a mounting which is free from vibration and is also free from loss of proper positioning due to the vibration of the automobile on which it is mounted.

Another object of the invention is to provide such a rear view vision mirror which is so designed that when the driver adjusts the angularity of the mirror as a whole to suit his position and height, the mirror is automatically adjusted to its maximum reflectivity. This insures that when the driver thereafter adjusts the mirror to its low intensity position, the desired low intensity image will be properly reflected.

Another object of the invention is to provide such a mirror in which the adjustment from high intensity to low intensity image reflection, and vice versa, is extremely simple so that the attention of the driver is not diverted to any substantial degree.

Another object of the invention is to provide such a rear vision mirror mounting which is extremely simple and rugged in construction and also low in cost.

Another object is to provide such a mirror and mounting which is attractive in appearance and forms a desirable accessory for the automobile.

Other objects and advantages of the invention will be apparent from the following description and drawings in which:

Fig. 1 is a vertical elevational view of a rear vision mirror supported by a mounting embodying our invention.

Fig. 2 is a rear elevation thereof.

Fig. 3 is an end elevational view viewed from the right hand end of Fig. 1 and showing one position of the parts.

Fig. 4 is a vertical section taken on line 4—4, Fig. 2, and showing another position of the parts.

Fig. 5 is a vertical section taken on line 5—5, Fig. 2, and showing the same position of the parts as is illustrated in Fig. 3.

Fig. 6 is a fragmentary vertical sectional view taken on line 6—6, Fig. 4.

Fig. 7 is a vertical section through the detached spacing rim between the primary mirror and the secondary transparent reflecting plate, the latter also being shown.

The invention is shown as embodied in a rear vision mirror having a metal backing plate 1 which is shown as being of generally rectangular form with rounding corners and which is shown as having a forwardly projecting marginal flange 2 which forms a pocket to receive the primary mirror 3. This primary mirror 3 is shown as being in the form of a glass plate 4 of the same form as this backing plate 1 and as having a reflective coating 5 of silver or the like applied to its rear face. The silvered or rear face of this primary mirror is disposed against the forward face of the metal backing plate 1, the usual piece 6 of cardboard or the like being interposed between these parts. The secondary transparent reflecting plate 8 is shown as being made of transparent glass and as being of substantially the same size and form as the primary mirror 3 and the metal backing plate 1. The primary mirror 1 and the secondary transparent reflecting plate 8 are held in fixed angularly divergent relation to each other by a spacing rim 9 of which a detached vertical sectional view is shown in Fig. 7. As there shown, the spacing rim 9 conforms to the marginal shape of the mirror panel 1 and transparent reflecting plate 8 and has a wide upper cross bar 10, downwardly converging side bars 11, and a narrow lower cross bar 12. Each of these bars is provided with a rear outer marginal recess 13 formed to receive the forwardly projecting flange 2 of the metal backing plate 1, a rear internal recess 14 formed to receive the rim of the mirror panel 1 and a front internal recess 15 formed to receive the front transparent reflecting plate 8. It will be seen that the panels 1 and 8 fitted in the internal recesses 15 and 14 of the spacing rim 9 are held at a slight angle relative to each other, this angle being shown as opening upwardly.

The primary mirror 1 and transparent reflecting plate 8 form a reflector having a pair of reflective surfaces arranged in vertical angular relation to each other to reflect to an observer images of different intensity when the reflector is shifted about its horizontal longitudinal axis, this being the axis which is disposed parallel with the both of these reflective surfaces. When the lower edges of the reflective surfaces are in the position shown in Figs. 3 and 5, this image is of high intensity, being reflected from the silvering or metallic coating 5. When the lower edges of these reflective surfaces are moved towards the eyes of the driver to the position shown in Fig. 9, this image is of low intensity, being from the front face of the front transparent panel 8.

The wide upper cross bar 10 of the spacing ring 9 is embraced by the upper cross part 18 of a bezel ring, indicated generally at 19, this upper cross part being relatively wide to embrace the spaced upper edges of the secondary transparent reflecting plate 8 and the primary mirror 3 as well as the piece 6 of cardboard and the sheet metal backing plate 1. The vertical end parts 20 of this bezel ring 19 are of downwardly converging form to conform to the angularity of the corresponding vertical edges of the secondary transparent reflecting plate 8 and primary mirror 3, and the lower cross part 21 of this bezel ring is comparatively narrow to embrace the lower edges of the secondary transparent reflecting plate 8 and the primary mirror 3 as well as the piece 6 of cardboard and the sheet metal backing plate 1. The rear edge 22 of this bezel ring is turned or flanged inwardly so as to engage the rear face of the metal backing plate 1, and the front edge 23 of this bezel is similarly turned or flanged inwardly so as to engage the forward face of the secondary transparent reflecting plate 8. It will therefore be seen that the bezel ring 19 holds the secondary transparent reflecting plate 8 and the primary mirror 3 in the spacing rim 9 and also secures these parts to the metal backing plate 1.

In the following description the terms "front" and "rear" will be used with reference to the rear vision mirror assembly and not the automobile.

The present invention is directed to an adjustable mounting for the rear vision mirror as above described and which permits the assembly as above described to be moved to one of two positions about an axis parallel with both of its reflective surfaces so as to reflect an image of the desired intensity.

This mounting is shown as comprising a stem 24 having a forward threaded end 25 which is adapted to be screwed into the automobile body and held in position thereon by means of a lock nut 26. The forward end of this stem 24 is shown as being formed to provide an enlarged ball 28. The stem 24 projects rearwardly through an opening 29 in a sheet metal supporting holder 30, the margin of this opening being offset rearwardly to provide a forwardly facing spherical seat 31 and engaging the rear side of the ball 28.

Firm contact is maintained between the ball 28 and this spherical seat 31 of the holder 30 by a spring retainer strip 32 having a spherical seat 33 engaging the forward side of the ball 28 and having two rearwardly projecting arms 34 which engage the forward face of the holder 30 at a distance from the ball 28. Intermediate the ball 28 and each of these arms 34 of the spring retainer plate 32 a rivet 35 passes through the spring retainer plate 32 and the holder 30, the rear head of each of these rivets preferably being recessed into the sheet metal holder 30 and the forward head thereof preferably being peened over, as indicated at 36 to insure proper pressure of the spring retainer strip 32 against the forward side of the ball 28 and to insure the desired friction in the ball joint so formed.

The sheet metal holder 30 is shown as being of cup shaped form and as having a rim 38 including parallel, flat end walls 39 projecting forwardly from a curving rear wall 40. Within the upper part of this cup-shaped sheet metal holder 30 the sheet metal backing plate 1 for the primary mirror 3 and secondary transparent reflecting plate 8 is formed to provide a pair of horizontally alining, parallel, vertical rearwardly projecting ears 41 and which are provided with horizontally alining holes 42. Within the lower part of the sheet metal cup shaped holder 30, the metal backing plate 1 is also formed to provide a pair of rearwardly projecting, horizontally alining, parallel ears 43 which are vertically disposed and which are provided with horizontally alining openings 44. These ears 43 are preferably spaced closer together than the ears 41.

A pivot pin 45 extends through the holes 42 of the upper pair of ears 41 and also through holes 46 provided in the parallel end walls 39 of the rim 38 of the cup shaped sheet metal holder 30. The sheet metal backing plate 1, together with the primary mirror 3 and the secondary transparent reflecting plate 8 carried thereby, pivot around the axis of the pivot pin 45 to one of two predetermined positions, one of these positions insuring the reflection of a high intensity image to the driver and the other of these positions insuring the reflection of a low intensity image. These two positions are determined by the upper and lower horizontal edges 48 and 49 of the rim 38 of the cup shaped holder 30. These upper and lower edges 48 and 49 of the rim 38 are arranged so that they do not simultaneously engage the rear face of the metal backing plate 1 of the rear vision mirror but form separate upper and lower stops acting against this metal backing plate.

With the lower edge 49 of the rim 38 of the cup shaped metal holder 30 in engagement with the rear side of the sheet metal backing plate 1, the primary mirror 3 and secondary transparent reflecting plate 8 are in position to reflect a high intensity image. With the upper edge 48 of the rim 38 of the cup shaped metal holder 30 in engagement with the rear face of the sheet metal backing plate 1, the primary mirror 3 and secondary transparent reflecting plate 8 are in position to reflect a low intensity image. That portion 50 of the forwardly projecting edge of each end wall 39 of the cup shaped metal holder 30 which is disposed below the pivot pin 45 is also preferably arranged at an angle to the portion 51 of this edge arranged above the pivot pin 45. This angularity is preferably such that the portions 50 of these edges engage the rear face of the sheet metal backing plate 1 at the same time that the lower edge or stop 49 of the rim 38, as shown in Fig. 5. Similarly, the portions 51 of these edges engage the rear face of this sheet metal backing plate 1 at the same time that the upper edges or stop 48 of the rim of the sheet metal holder engages the rear face of this sheet metal backing plate, as shown in Fig. 4.

It is desirable to hold the sheet metal backing plate 1 in either of the two selected positions with reference to the cup shaped sheet metal holder 30. For this purpose the lower horizontal edge 49 of the cup shaped sheet metal holder 30 is formed to provide a pair of forwardly and upwardly projecting lips 52 which are housed within the cup-shaped sheet metal holder. These lips are in horizontal alinement and support the cross part 53 of a C-shaped wire spring 54, the two arms 55 of which extend upwardly along the outside of the ears 43 and have hook-shaped ends 56 which project through and are anchored in the openings 44 in these ears. This C-shaped spring 54 biases the sheet metal backing plate 1 upwardly with reference to the cup-shaped sheet metal holder 30, and the openings 44 in the pair of ears 43 are so disposed that the plane of the C-shaped spring 54 is disposed forwardly of the pivot pin 45 when the mirror assembly is in its low intensity image reflecting position shown in Fig. 4 and is disposed in rear of this pivot pin when the mirror assembly is disposed in its high intensity image position shown in Fig. 5. In other words the C-shaped metal spring 54 is carried beyond dead center in moving the mirror assembly to either of its two adjusted positions and hence tends to hold the mirror assembly in the selected position of adjustment.

For convenience in adjusting the mirror assembly to one of the preselected positions, the cup-shaped sheet metal holder 30 is formed to provide a downwardly extending fingerpiece 58 the lower end of which is bent forwardly, as indicated at 59, to closely fit the lower horizontal part 21 of the bezel ring 19.

The adjustment of the rear vision mirror to suit different driving conditions is extremely simple. It is first necessary, of course, to aline the mirror as a whole to reflect the view from the rear window of the automobile and also to aline the mirror horizontally. This alinement is determined by the height and position of the driver and involves rotating the ball seats 29 and 33 of the cup-shaped sheet metal holder 30 and the spring retainer 32, about respectively, the ball 28 and which offers comparatively high resistance due to the pressure of the spring retainer strip 32 against the forward face of the ball.

In such adjustment it is desired that the adjustment be made with the high intensity image being reflected by the rear vision mirror. To simultaneously adjust the rear vision mirror as a whole to the desired angularity and also to adjust it to the high intensity position, the driver places his finger upon the upper horizontal cross part 18 of the bezel ring 19 and places his thumb against the forwardly projecting part 59 of the fingerpiece 58 of the sheet metal cup-shaped holder 30. Since the ball and socket joint which is moved for the adjustment of the mirror as a whole offers comparatively high resistance to movement, the driver in so seizing the mirror exerts a considerable downward pressure on the upper horizontal cross part 18 of the bezel ring 19 and an upward pressure on the forwardly projecting part 59 of the finger piece 58 of the cup-shaped metal holder 30. Accordingly, if at this time the mirror should be in a position to reflect the low intensity image, the downward pressure exerted on the upper horizontal cross part 18 of the bezel ring 19 will cause the lower edge of the bezel ring to swing rearwardly into engagement with the stop edge 49 of the cup-shaped metal holder 30. In this position the mirror assembly is in its high intensity image projecting position and the mirror is accordingly adjusted as a whole both to its proper position with reference to the driver and the rear window of the automobile and also to its high intensity image reflecting position while making such adjustment.

After making this adjustment, if the driver desires a low intensity reflection, all that is necessary is for him to seize the bezel ring 19 of the mirror and move its lower edge forwardly or toward his eyes as far as is permitted. The amount of such movement is determined by the engagement of the upper horizontal edge or stop 48 of the cup-shaped sheet metal holder 30 with the rear face of the sheet metal backing plate 1. This position is determined, of course, to bring the desired low intensity image into view, the decrease in the intensity of the image being due to the fact that in this position the image is reflected from the front face of the transparent reflecting plate 8 and not from the metallic coating 5 as with the image of high intensity. In so moving the rear vision mirror to its low intensity image reflecting position, the C-shaped metal spring 54 is carried beyond the dead center so as to yieldingly hold the rear vision mirror in this position until deliberately returned to its high intensity image reflecting position.

To restore the rear vision mirror to its high intensity image reflecting position, the driver merely moves the lower part of the bezel ring 19 rearwardly or away from his eyes to again carry the C-shaped metal spring 54 beyond dead center and which automatically effects engagement of the lower horizontal edge or stop 49 of the cup-shaped metal holder 30 with the rear face of the sheet metal backing plate 1. This restores the mirror to its original condition in which an image of high intensity is reflected to the driver.

From the foregoing it will be seen that the present invention provides a rear vision mirror wherein the brightness of the reflected image can easily and positively be adjusted to the desired intensity and wherein the mirror is free from vibration and loss of proper adjustment due to vibration of the car. It will also be seen that the mirror is of simple and low cost construction and pleasing appearance. It is also so designed that when the driver adjusts the angularity of the mirror as a whole to suit his position, and height, the mirror is automatically adjusted to its maximum reflectivity so that when a secondary adjustment is made to reflect an image of low intensity, the desired low intensity image will be properly reflected into his eyes.

We claim:

1. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a metal holder arranged in rear of said backing plate and having an opening receiving said stem and a spherical seat surrounding said opening and facing said backing plate and fitting the corresponding side of said ball, the upper edge of said metal holder being arranged below the upper edge of said metal backing plate and the lower edge of said metal holder being arranged above the lower edge of said metal backing plate, a retainer fast to the side of said holder and facing said backing plate and bearing against the side of said ball opposite said seat, a pivotal connection between said backing plate and holder and permitting movement of said backing plate about a horizontal axis intermediate said upper and lower edges of said metal holder and which axis is generally parallel with both of said reflective surfaces, a stop at the upper part of said holder and engaging the rear face of said backing plate to limit movement of said backing plate and reflector to reflect an image of one intensity and a stop at the lower part of said holder and engaging the rear face of said backing plate to limit movement of said backing plate and reflector to reflect an image of another intensity.

2. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a cup-shaped metal holder arranged in rear of and opening toward said backing plate and having an opening receiving said stem and a spherical seat surrounding said opening and facing said backing plate and fitting the corresponding side of said ball, the upper edge of said metal holder being arranged below the upper edge of said metal backing plate and the lower edge of said metal holder being arranged above the lower edge of said metal backing plate, a retainer housed in and fast to said holder and bearing against the side of said ball opposite its seat, a pivotal connection between the rim of said cup-shaped holder and said backing plate and permitting movement of said backing plate about a horizontal axis intermediate said upper and lower edges of said metal holder and which axis is generally parallel with both of said reflective surfaces, a stop at the upper part of said holder and engaging the rear face of said backing plate to limit movement of said backing plate and reflector to reflect an image of one intensity and a stop at the lower part of said holder and engaging the rear face of said backing plate to limit movement of said backing plate and reflector to reflect an image of another intensity.

3. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a cup-shaped metal holder arranged in rear of and opening toward said backing plate and having an opening receiving said stem and a spherical seat surrounding said opening and facing said backing plate and fitting the corresponding side of said ball, a retainer housed in and fast to said holder and bearing against the side of said ball opposite its seat, a pair of horizontally alined ears projecting rearwardly from said backing plate, a pivot pin extending through said ears and through the rim of said cup-shaped holder and arranged generally parallel with both of said reflecting surfaces to permit a corresponding movement of said reflector relative to said holder, a stop at the upper part of said holder and limiting movement of said backing plate and reflector to reflect an image of one intensity, and a stop at the lower part of said holder and limiting movement of said backing plate and reflector to reflect an image of another intensity.

4. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a metal holder arranged in rear of said backing plate and having an opening receiving said stem and a spherical seat surrounding said opening and facing said backing plate and fitting the corresponding side of said ball, a retainer fast to the side of said holder and facing said backing plate and bearing against the side of said ball opposite said seat, a pivotal connection between said backing plate and holder and permitting movement of said backing plate about an axis generally parallel with both of said reflective surfaces, a stop at the upper part of said holder and limiting movement of said backing plate and reflector to reflect an image of one intensity, a stop at the lower part of said holder and limiting movement of said backing plate and reflector to reflect an image of another intensity and a finger-piece projecting downwardly from said holder to a position adjacent the lower edge of said backing plate.

5. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a metal holder arranged in rear of said backing plate and having an opening receiving said stem and a spherical seat surrounding said opening and facing said backing plate and fitting the corresponding side of said ball, a retainer fast to the side of said holder and facing said backing plate and bearing against the side of said ball opposite said seat, a pivotal connection between said backing plate and holder and permitting movement of said backing plate about an axis generally parallel with both of said reflective surfaces, a stop at the upper part of said holder and limiting movement of said backing plate and reflector to reflect an image of one intensity, a stop at the lower part of said holder and limiting movement of said backing plate and reflector to reflect an image of another intensity and a fingerpiece projecting downwardly from said holder to a position below the lower edge of said backing plate and thence forwardly under the lower edge of said mirror assembly whereby adjustment of said mirror assembly about said ball by seizing the upper rim of said mirror assembly and said forwardly projecting fingerpiece with the fingers and thumb of one hand operates to engage said backing plate with said stop at the lower part of said holder.

6. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a cup-shaped metal holder arranged in rear of and opening toward said backing plate and having an opening receiving said stem and a spherical seat surrounding said opening and facing said backing plate and fitting the corresponding side of said ball, a retainer housed in and fast to said holder and bearing against the side of said ball opposite its seat, a pair of horizontally alined ears projecting rearwardly from said backing plate, a pivot pin extending through said ears and through the rim of said cup-shaped holder and arranged generally parallel with both of said reflecting surfaces to permit a corresponding movement of said reflector relative to said holder, a stop at the upper part of said holder and limiting movement of said backing plate and reflector to reflect an image of one intensity, a stop at the lower part of said holder and limiting movement of said backing plate and reflector to reflect an image of another intensity and a fingerpiece projecting downwardly from said holder to a position below the lower edge of said backing plate and thence forwardly under the lower edge of said mirror assembly about said ball by seizing the upper rim of said mirror assembly and said forwardly projecting fingerpiece with the fingers and thumb of one hand operates to engage said backing plate with said stop at the lower part of said holder.

7. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a metal holder arranged in rear of said backing plate and having an opening receiving said stem and a spherical seat surrounding said opening and facing said backing plate and fitting the corresponding side of said ball, a retainer fast to the side of said holder and facing said backing plate and bearing against the side of said ball opposite said seat, a pivotal connection between said backing plate and holder and permitting movement of said backing plate about an axis generally parallel with both of said reflective surfaces, a stop at the upper part of said holder and limiting movement of said backing plate and reflector to reflect an image of one intensity, a stop at the lower part of said holder and limiting movement of said backing plate and reflector to reflect an image of another intensity and a spring having upper and lower ends one of which is secured to said holder and the other of which is secured to said backing plate to bias said backing plate vertically with reference to said holder, the said end of said spring adjacent said axis being arranged to shift from one side to the other of the centerline between said axis and the end of said spring remote from said axis when said backing plate is moved from engagement with one of said stops and into engagement with the other of said stops.

8. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a metal holder arranged in rear of said backing plate and having an opening receiving said stem and a spherical seat surrounding said opening and facing said backing plate and fitting the corresponding side of said ball, a retainer fast to the side of said holder and facing said backing plate and bearing against the side of said ball opposite said seat, a pivotal connection between said backing plate and holder and permitting movement of said backing plate about an axis generally parallel with both of said reflective surfaces, a stop at the upper part of said holder and limiting movement of said backing plate and reflector to reflect an image of one intensity, a stop at the lower part of said holder and limiting movement of said backing plate and reflector to reflect an image of another intensity and a vertically yielding spring arranged intermediate said holder and backing plate, below said axis and having its upper end secured to said backing plate and its lower end secured to said holder to bias said backing plate vertically with reference to said holder, the said upper end of said spring being arranged to shift from one side to the other of the centerline between said axis and the lower end of said spring when said backing plate is moved from engagement with one of said stops into engagement with the other of said stops.

9. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a cup-shaped metal holder arranged in rear of and opening toward said backing plate and having an opening receiving said stem and a spherical seat surrounding said opening and facing said backing plate and fitting the corresponding side of said ball, a retainer housed in and fast to said holder and bearing against the side of said ball opposite its seat, a pivotal connection between the rim of said cup-shaped holder and said backing plate and permitting movement of said backing plate about an axis generally parallel with both of said reflective surfaces, a stop at the upper part of said holder and limiting movement of said backing plate and reflector to reflect an image of one intensity, a stop at the lower part of said holder and limiting movement of said backing plate and reflector to reflect an image of another intensity and a spring housed within said cup-shaped holder and having upper and lower ends one of which is secured to said holder and the other of which is secured to said backing plate to bias said backing plate vertically with reference to said holder, the said end of said spring adjacent said axis being arranged to shift from one side of the centerline between said axis and the end of said spring remote from said axis when said backing plate is moved from engagement with one of said stops into engagement with the other of said stops.

10. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a cup-shaped metal holder arranged in rear of and opening toward said backing plate and having an opening receiving said stem and a spherical seat surrounding said opening and facing said backing plate and fitting the corresponding side of said ball, a retainer housed in and fast to said holder and bearing against the side of said ball opposite its seat, a pivotal connection between the rim of said cup-shaped holder and said backing plate and permitting movement of said backing plate about an axis generally parallel with both of said reflective surfaces, a stop at the upper part of said holder and limiting movement of said backing plate and reflector to reflect an image of one intensity, a stop at the lower part of said holder and limiting movement of said backing plate and reflector to reflect an image of another intensity, an ear projecting rearwardly from said backing plate below the axis of said pivotal connection, a lip projecting forwardly from the lower part of said holder and arranged below said ear, and a vertically yielding spring interposed between said ear and said lip, said ear being arranged to shift from one side to the other of the centerline between said axis and said lip when said backing plate is moved from engagement with one of said stops into engagement with the other of said stops.

11. An adjustable mounting for supporting from a stem having a ball at the free end thereof a rear vision mirror assembly having a metal backing plate supporting a reflector having a pair of reflective surfaces arranged in vertical angular relation to each other to reflect to an observer images of different intensity when shifted about an axis generally parallel with both of said surfaces, comprising a cup-shaped metal holder arranged in rear of and opening toward said backing plate and having an opening receiving said stem and a spherical seat surrounding said opening and facing said backing plate and fitting the corresponding side of said ball, a retainer housed in and fast to said holder and bearing against the side of said ball opposite its seat, a pair of horizontally alined ears projecting rearwardly from said backing plate, a pivot pin extending through said ears and through the rim of said cup-shaped holder and arranged generally parallel with both of said reflecting surfaces to permit a corresponding movement of said reflector relative to said holder, a stop at the upper part of said holder and limiting movement of said backing plate and reflector to reflect an image of one intensity, a stop at the lower part of said holder and limiting movement of said backing plate and reflector to reflect an image of another intensity, a fingerpiece projecting downwardly from said holder to a position below the lower edge of said backing plate and thence forwardly under the lower edge of said mirror assembly whereby adjustment of said mirror assembly about said ball by seizing the upper rim of said mirror assembly and said forwardly projecting fingerpiece with the fingers and thumb of one hand operates to engage said backing plate with said stop at the lower part of said holder, a second pair of horizontally alined ears projecting rearwardly into said cup-shaped holder from said backing plate below said first pair of ears, a pair of horizontally alined, upwardly opening curved lips projecting rearwardly from the lower edge of said holder on opposite sides of said fingerpiece, a C-shaped spring having its cross part seated in said lips and its arms projecting upwardly and each secured to one of said second pair of ears and biasing said backing plate vertically with reference to said holder, said second pair of ears being arranged to shift from one side to the other of the centerline between said pivot pin and lips when said backing plate is moved from engagement with one of said stops into engagement with the other of said stops.

PAUL BERTELL.
LYNN C. MEADE.

References Cited in the file of this patent

UNITED STATES PATENTS

| Number | Name | Date |
| --- | --- | --- |
| 2,325,615 | La Hodny et al. | Aug. 3, 1943 |
| 2,356,432 | Roedding | Aug. 22, 1944 |
| 2,420,259 | McNamara | May 6, 1947 |
| 2,455,818 | Sherts | Dec. 7, 1948 |
| 2,469,207 | Roedding | May 3, 1949 |
| 2,502,699 | Budreck | Apr. 4, 1950 |